United States Patent [19]

Oba

[11] Patent Number: 5,074,729

[45] Date of Patent: Dec. 24, 1991

[54] DRILL SCREW HAVING CUTTING EDGES EACH FORMING AN ARC CURVING TO A HEAD SIDE

[75] Inventor: Noboru Oba, Kashiwara, Japan

[73] Assignee: Kokubu Kagaku Kogyo Co., Ltd., Osaka, Japan

[21] Appl. No.: 596,373

[22] Filed: Oct. 12, 1990

[30] Foreign Application Priority Data

Jul. 23, 1990 [JP] Japan .................... 2-196930

[51] Int. Cl.$^5$ ............................. F16B 25/00
[52] U.S. Cl. ........................ 411/387; 408/230
[58] Field of Search .............. 411/386, 387; 408/212, 408/233, 229, 230

[56] References Cited

U.S. PATENT DOCUMENTS

| | | | |
|---|---|---|---|
| 3,463,045 | 8/1969 | Prescott | 411/387 |
| 4,125,050 | 11/1978 | Schwartzman et al. | 411/387 |
| 4,209,275 | 6/1980 | Kim | 408/230 |
| 4,407,620 | 10/1983 | Shinjo | 411/387 |
| 4,529,341 | 7/1985 | Greene | 408/230 |

FOREIGN PATENT DOCUMENTS 2398211 2/1979 France ..................... 411/387

Primary Examiner—Neill R. Wilson
Attorney, Agent, or Firm—Sandler, Greenblum & Bernstein

[57] ABSTRACT

A drill screw is composed of a drill portion on a tip of the drill screw, a threaded portion succeeding to the drill portion and a head succeeding to the threaded portion whereby a ridge on the threaded portion threads into an inside wall of a hole the drill portion drills through a punctured object. The drill screw has cutting edges leading from both ends of a chisel positioned at the center of the tip of the drill screw. Each of the cutting edges forms an arc curving to a head side in an axial direction of the drill screw. Also, a shape of each of the cutting edges forms an arc curving to a back in a rotational direction of the drill screw.

10 Claims, 1 Drawing Sheet

DRILL SCREW HAVING CUTTING EDGES EACH FORMING AN ARC CURVING TO A HEAD SIDE

BACKGROUND OF THE INVENTION

The present invention relates to an improvement of a drill screw.

Drill screws are self-tapping screws used to hold two members together by means of drill portions which pierce said two members, ridges of a threaded portion following the drill portions threading into holes so formed, and heads following the threaded portion.

The drill portion on a conventional drill screw is shaped as shown in FIG. 4 which is an enlarged view of the drill portion. A chisel 1 to set the position of the drill screw to the work piece is provided at the center tip of this drill screw. This chisel 1 is formed by the intersection of two relative planes 2 (only one of which is shown in FIG. 4) having a specific angle to the axis of the drill screw. The shape of the chisel forms a line perpendicular to the axis. In addition, cutting edges 3 and 4 following off ends 1a and 1b of the chisel 1 extend in a straight line towards outside face 5 of the drill screw, forming a general line of a conical shape centering on the axis of the drill screw.

A conventional drill screw thus described has the following problems. Specifically, when a hole is opened in a work piece by the drill screw, a cutting load is applied to cutting edges 3 and 4. For any given material, if the angles of rakes of these cutting edges are the same, the cutting loads at this time increase as the lengths of the cutting edges 3 and 4 increase. In other words, the cutting load applied to the drill screw is dependent upon the diameter of the drill screw. As a result, there is a limit to the diameter of the drill screw which is manually drillable, and the problem exists that drill screws with diameters greater than or equal to 6.3 mm cannot be manually drilled into a work piece.

In addition, in environments with poor working conditions, it often occurs that the drill screw cannot be held perpendicular to the surface of the work piece, thus causing the drill screw to enter at an angle. In such cases, it is very hard for the chisel 1 to bite the work piece at the specified location. As a result, the reaction force of the work piece causes the tip of the drill screw to slide, causing the drill screw to walk across the surface without fixing the position of the drill hole.

SUMMARY OF THE INVENTION

Therefore, the object of the present invention is to provide a drill screw with good cutting characteristics resistant to staggering.

In order to accomplish the above object, the present invention provides a drill screw comprising a drill portion on a tip of the drill screw, a threaded portion succeeding to the drill portion and a head succeeding to the threaded portion whereby a ridge on the threaded portion threads into an inside wall of a hole while the drill portion drills through a punctured object, said drill screw having cutting edges leading from both ends of a chisel positioned at the center of the tip of the drill screw each forming an arc curving to a head side in an axial direction of the drill screw.

In the present invention, the shape of the cutting edge forms an arc curving towards the head, i.e., the back in the axial direction. Therefore, the cutting load per unit length of cutting edge is less than that occurring when the shape of the cutting edge is a straight line. Furthermore, because the shape of the cutting edge forms an arc curving towards the back in the axial direction, the slope with respect to the axis of the curved cutting edge is less at the center portion and greater at the circumference portion when compared with a conventional straight cutting edge. On the other hand, the rotational speed of the drill screw is slow at the center portion and fast at the circumferential portion. Thus, because the slope to the axis of the cutting edge at the center portion where the rotational speed is slow is less than that of a conventional drill screw, the cutting load is significantly decreased at the center portion. It is to be noted that the slope to the axis of the cutting edge at the outside circumference portion is greater than that of a conventional drill screw, but because the rotational speed is greater at the outside circumference portion, there is not a significant increase in the cutting load. As a result, the cutting load of the overall cutting edge is less than when the cutting edge forms a straight line. Therefore, the cutting load acting on the cutting edge is significantly reduced from that of a conventional cutting edge, and a hole can be easily opened in the work piece by rotation of the drill screw.

It is preferable that a shape of the cutting edges forms an arc curving to a back in a rotational direction of the drill screw.

In the case that the shape of the cutting edge forms an arc curving towards the back in the direction of rotation, and the cutting edge slopes in the direction of cutting edge advance (i.e., the direction of rotation), the vertical component of the cutting load acting on the cutting edge is decreased, and a hole can be drilled even more easily.

Furthermore, it is preferable that a shape of the chisel forms an arc curving to the head side in the axial direction.

When the shape of the chisel forms an arc curving towards the back in the axial direction, both ends of the chisel cut sharply toward the forwards due to the combined effect of the shape of the cutting edges leading from both ends of the chisel also forming an arc curving towards the back in the axial direction. Therefore, even when the drill screw cannot be held vertically to the surface of the work piece and is therefore at an angle to said surface, either end of the chisel can easily bite the work piece, and the position of the drill screw can be easily fixed.

Moreover, preferably, rake faces of the cutting edges are formed in two stages in the axial direction, a rake angle in the axial direction on a tip side being greater than a rake angle in the axial direction on the head side.

In this case, a large rake angle in the axial direction can be obtained without making the slope of the rake face greater than that of a conventional drill screw, and a hole can be easily opened in the work piece.

To sum up, the effects of the present invention are as follows.

A drill screw according to the present invention reduces the cutting load acting on the cutting edge and improves cutting performance. Thus, worker fatigue is reduced and this drill screw is particularly effective in poor working conditions because cutting performance is good.

In addition, a drill screw according to the present invention further improves cutting performance because the shape of the cutting edge forms an arc curving to the back in the direction of rotation.

Furthermore, in a drill screw according to the present invention, because the shape of the chisel forms an arc curving to the back in the axial direction, this in combination with the shape of the cutting edge forming an arc curving to the back in the axial direction causes both ends of the chisel to cut sharply to the forward. Therefore, even if the drill screw is at an angle to the surface of the work piece, the chisel easily bites into the work piece and cannot easily walk along the surface. Thus, a drill screw according to the present invention is particularly effective in poor working conditions because the tip does not walk and cutting performance is good.

Furthermore, because the rake angle at the tip of the rake face is formed greater than the rake angle at the base side in a drill screw, the rake angle of the tip only can be made larger while holding the slope of the cutting edge at the base approximately equal to the rake angle of a conventional drill screw. As a result, the rake angle of the cutting edge can be increased, and the cutting load can be further reduced.

Thus, because the tip does not walk and cutting performance is good, worker fatigue is low and the drill screw is ideally suited to use in poor working conditions.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
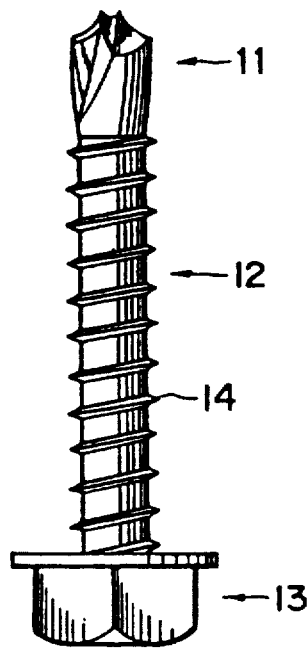
FIG. 1 is an external view of a preferred embodiment of a drill screw according to the present invention.

Before the description of the present invention proceeds, it is to be noted that like parts are designated by like reference numerals throughout the accompanying drawings.

Referring now to FIG. 1, this drill screw comprises a drill portion 11, a threaded portion 12, and a head 13, and may be used as follows to fasten multiple metal sheets together. Specifically, the drill portion 11 of the above drill screw is pressed against the surface of the first metal sheet, and the head 13 is turned. Rotation of the head causes the drill portion 11 to pierce a hole in the multiple metal sheets layered together, and the thread ridge 14 on the threaded portion 12 threads in along the inside wall of the drilled hole. The multiple metal sheets are thus fastened together by tightening the drill screw.

Figure 2:
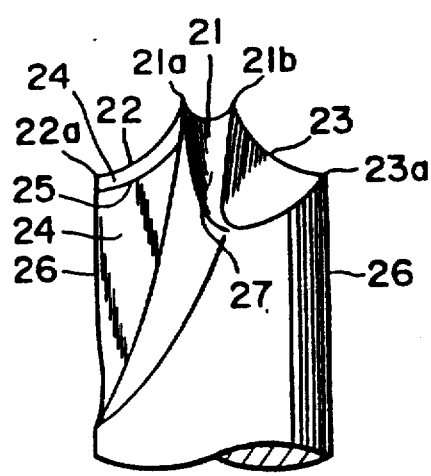
FIG. 2 is an enlarged front view of a drill portion in FIG. 1.
Figure 3:
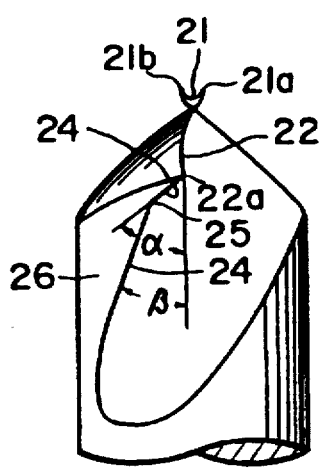
FIG. 3 is an enlarged side view of the drill portion in FIG. 1.

FIGS. 2 and 3 are enlarged views of the drill portion 11 of the above drill screw; FIG. 2 is a front view, and FIG. 3 is a side view. The shape of the chisel 21 of the drill screw in the present invention is an arc curving towards the back in the axial direction. Furthermore, the cutting edges 22, 23, which lead off from both ends 21a, 21b of the chisel 21 towards the outside surface 26 of the drill screw, each form an arc curving towards the back in the axial direction as shown in FIG. 2, and additionally form an arc curving to the back in the direction of rotation as shown in FIG. 3.

As thus described, while the chisel 21 forms an arc curving to the back in the axial direction, the cutting edges 22, 23 also each form an arc curving to the back in the axial direction. As a result, the ends 21a, 21b of the chisel 21 thus cut sharply to the forward. Thus, even when the drill screw cannot be held perpendicularly to the surface of the work piece, the sharply cut end 21a or 21b of the chisel 21 can easily catch the surface of the work piece, thereby enabling the chisel 21 to easily bite into the work piece. Therefore, even in poor working conditions where the drill screw is unavoidably placed at a slope to the surface of the work piece, the drill screw will not walk across the surface and the position of the hole can be easily fixed.

In addition, the cutting edges 22, 23 form an arc curving towards the back in the axial direction and in the direction of rotation. By being thus formed, the length along the edge of the cutting edges 22, 23 can be made longer than that when the cutting edges 22, 23 form a straight line. Therefore, the cutting load per unit length of the cutting edges 22, 23 can be reduced as compared with that of a conventional straight cutting edges. Moreover, because the cutting edges 22, 23 form an arc curving to the back in the axial direction, the slope of the curved cutting edges 22, 23 to the axis is less at the center than that formed by a conventional straight cutting edge. On the other hand, the slope of the cutting edges 22, 23 to the axis is greater at the outside than that formed by a conventional straight cutting edge. Also, the rotational speed of the drill screw is slow at the center and fast at the outside circumference.

Thus, because the slope to the axis of the cutting edges 22, 23 at the center where the rotational speed is slow is smaller than that in a conventional drill screw, the cutting load acting at the center of the cutting edges 22, 23 is also significantly reduced. On the other hand, the slope of the cutting edges 22, 23 to the axis at the outside circumference is greater than that in a conventional drill screw. However, because the rotational speed is fast at the outside circumference, the cutting load is not increased by a proportional degree. As a result, the cutting load applied overall to the cutting edges 22, 23 can be made less than that occurring with a straight cutting edge.

By thus reducing the cutting load acting on the cutting edges 22, 23, the cutting performance of the drill screw can be greatly improved.

Furthermore, by shaping the cutting edges 22, 23 to form an arc curving to the back in the rotational direction, the cutting edges 22, 23 are sloped at a given angle to the direction of advance (direction of rotation) of the cutting edges 22, 23. As a result, the vertical component of the cutting load to the cutting edges 22, 23 can be reduced, and cutting performance can be further improved.

Figure 4:
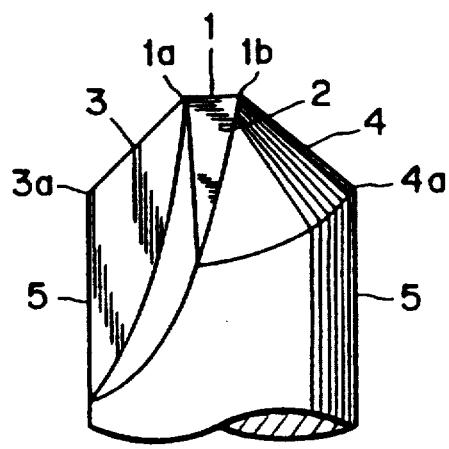
FIG. 4 is an enlarged view of a drill portion in a conventional drill screw.

Moreover, the following effects are obtained by forming the cutting edges 22, 23 as arcs curving to the back in the axial direction. Specifically, with a conventional drill screw, the cutting edges 3, 4 form an obtuse angle to the outside surface 5 as shown in FIG. 4 because the cutting edges 3, 4 form straight lines. Therefore, as the chisel 1 of the drill screw pierces the work piece and the edges 3a, 4a on the outside of the cutting edges 3, 4 approach the back of the work piece, the diameter of the hole rapidly approaches the diameter of the drill screw, and a minimal amount of uncut material remains immediately before the edges 3a, 4a of the cutting edges 3, 4 penetrate through to the back. This remaining minimal uncut material is thus forced to the outside of the hole by shear pressure resulting from the force applied to the drill screw in the axial direction, resulting in burrs on the back of the work piece.

On the other hand, the cutting edges 22, 23 each form an arc curved to the back in the axial direction in a drill screw according to the present invention. Therefore, the cutting edges 22, 23 form a near perpendicular angle to the outside surface 26 as shown in FIG. 2. As a result, the uncut material remaining immediately before the ends 22a, 23a of the cutting edges 22, 23 penetrate to the back is greater than that when the angle of the cutting edges to the outside surface 26 is an obtuse angle. As a result, the last remaining uncut material is harder to push through to the back, and it is therefore cut by the cutting edges 22, 23. In other words, burrs do not occur at the back of the work piece with a drill screw according to the present invention.

Thus, a special case of the formation of the cutting edges 22, 23 wherein each forms an arc curving to the back in the axial direction is that case wherein the angle of the cutting edge to the outside surface is an acute angle. In this case, even if the end of the cutting edge on the outside in the radial direction approaches the back of the work piece, the diameter of the hole does not rapidly approach the diameter of the drill screw. Rather, the outside ends of the cutting edge in the radial direction reach the back of the work piece before that part of the cutting edge inside and near these outside ends. Therefore, before the last remaining uncut material is pushed outside the hole by the shear pressure from the drill screw, the uncut material is cut out by the outside edges of the cutting edge, and burrs thus do not occur at the back of the work piece.

In addition, cutting performance is improved in the present invention as described below.

Specifically, the rake angle $\beta$ (hereinafter simply rake angle) in the axial direction of the rake face 24 (only one side shown in FIG. 3) forming one face of cutting edges 22, 23 is changed to an even larger rake angle $\alpha$ at a point 25 near the cutting edge tip. This makes it possible to obtain a large rake angle $\alpha$ only at the cutting edge tip while holding the slope to the axial direction at the bottom side of the rake face 24 at an angle approximately equal to the rake angle (e.g., $\beta$) of a conventional drill screw. Therefore, cutting performance can be further improved with a rake face on the bottom side having a slope approximately equal to a conventional drill screw.

Because cutting performance is good with a large rake angle $\alpha$, the uncut material remaining immediately before the ends 22a, 23a of the cutting edges 22, 23 penetrate to the back can be easily cut, thus contributing greatly to the prevention of formation of burrs by the uncut material.

As described hereinabove, the cutting edges 22, 23 in a drill screw according to the present invention each form an arc curving to the back in the axial and rotational directions. Therefore, the cutting load applied to the cutting edges 22, 23 can be reduced and the cutting performance of the drill screw can be improved.

Furthermore, the shape of the chisel 21 also forms an arc curving to the back in the axial direction. This combined with the shape of the cutting edges 22, 23 being an arc curving to the back in the axial direction causes the ends 21a, 21b of the chisel 21 to cut sharply to the advancing direction. Therefore, even if the drill screw is at an angle to the surface of the work piece, the chisel 21 can easily bite the work piece and the drill screw be thus positioned, thus preventing the drill screw from walking across the surface of the work piece. Moreover, a large rake angle $\alpha$ can be obtained by changing the rake angle of the rake face 24 to a large rake angle near the tip but without increasing the slope at the base of the cutting edge 22. Therefore, cutting performance can be further improved, thus improving work efficiency.

The cutting performance of the drill screw is thus greatly improved with the present invention by forming the cutting edges 22, 23 of the drill screw as arcs curving to the back in the axial and rotational directions and making the rake angle $\alpha$ greater than that in a conventional drill screw as described hereinabove. As a result, whereas 6.3 mm was the maximum diameter manually drillable with a conventional drill screw, the present invention makes it possible to manually drill a drill screw up to 8 mm diameter.

Furthermore, because a drill screw according to the present invention does not walk and has good cutting performance, worker fatigue is reduced, and this drill screw may be considered most ideally suited to poor working conditions.

The shapes of the chisel 21 and the cutting edges 22, 23 in a drill screw according to the present invention are simple arcs curving to the back in the axial and rotational directions with the angle of the rake face 24 changing only at the tip. Therefore, the cutting edges 22, 23 can be easily formed by cold forging using two symmetrical tools each with matching rake faces.

As shown in FIG. 2, the two faces 27 (only one side shown in FIG. 2) leading to both ends of and forming the chisel 21 are concave faces, but this invention shall not be so limited. Essentially, it is sufficient if the shape of the chisel 21 is a surface forming an arc curving to the back in the axial direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A drill screw comprising a drill portion on a tip of the drill screw, said drill portion having an outer circumference, a threaded portion adjacent to the drill portion and a head adjacent to the threaded portion whereby a ridge forming a thread on the threaded portion threads into an inside wall of a hole while the drill portion drills through a punctured object, said drill portion having cutting edges leading from both ends of a chisel positioned at the center of the tip of the drill screw, each cutting edge forming an arc curving towards said head in an axial direction of the drill screw from said chisel to said outer circumference of said drill portion, the length of said arc being greater than a straight line between said chisel and said outer circumferential, whereby a cutting load per unit length of said arc is less than a cutting load per unit length of the straight line.

2. A drill screw according to claim 1 wherein a shape of the cutting edges forms an arc curving towards said head and in a rotational direction of the drill screw.

3. A drill screw according to claim 1 wherein a shape of the chisel forms an arc curving to the head side in the axial direction.

4. A drill screw according to claim 2 wherein a shape of the chisel forms an arc curving to the head side in the axial direction.

5. A drill screw according to claim 1 wherein rake faces of said cutting edges are formed in two stages in the axial direction said two stages being on the side towards said tip and the side toward said head, respectively, a rake angle between the cutting edges in the axial direction on a tip side being greater than a rake angle between cutting edges in the axial direction on the head side.

6. A drill screw according to claim 2 wherein rake faces of said cutting edges are formed in two stages in the axial direction said two stages being on the side towards said tip and the side toward said head, respectively, a rake angle between the cutting edges in the axial direction on a tip side being greater than a rake angle between cutting edges in the axial direction on the head side.

7. A drill screw according to claim 3 wherein rake faces of said cutting edges are formed in two stages in the axial direction said two stages being on the side towards said tip and the side toward said head, respectively, a rake angle between the cutting edges in the axial direction on a tip side being greater than a rake angle between cutting edges in the axial direction on the head side.

8. A drill screw according to claim 4 wherein rake faces of said cutting edges are formed in two stages in the axial direction said two stages being on the side towards said tip and the side toward said head, respectively, a rake angle between the cutting edges in the axial direction on a tip side being greater than a rake angle between cutting edges in the axial direction on the head side.

9. A drill screw comprising a drill portion on a tip of the drill screw, a threaded portion adjacent to the drill portion and a head adjacent to the threaded portion whereby a ridge forming a thread on the threaded portion threads into an inside wall of a hole while the drill portion drills through a punctured object,
   said drill portion having cutting edges leading from both ends of a chisel positioned at the center of the tip of the drill screw each forming an arc curving to a head side in an axial direction of the drill screw, wherein a shape of the chisel forms an arc curving to the head side in the axial direction.

10. A drill screw comprising a drill portion on a tip of the drill screw, a threaded portion adjacent to the drill portion and a head adjacent to the threaded portion whereby a ridge forming a threaded on the threaded portion threads into an inside wall of a hole while the drill portion drills through a punctured object,
    said drill portion having cutting edges leading from both ends of a chisel positioned at the center of the tip of the drill screw each forming an arc curving to a head side in an axial direction of the drill screw, wherein a shape of the cutting edges forms an arc curving towards said head and in a rotational direction of the drill screw, and wherein a shape of the chisel forms an arc curving to the head side in the axial direction.

* * * * *